(12) United States Patent
Ushiki (10) Patent No.: US 8,843,143 B2
(45) Date of Patent: Sep. 23, 2014

(54) WIRELESS BASE STATION AND MOBILE STATION

(75) Inventor: Kazumasa Ushiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 311 days.

(21) Appl. No.: 12/630,531

(22) Filed: Dec. 3, 2009

(65) Prior Publication Data

US 2010/0081446 A1 Apr. 1, 2010

Related U.S. Application Data

(63) Continuation of application No. PCT/JP2007/061348, filed on Jun. 5, 2007.

(51) Int. Cl.
*H04W 72/00* (2009.01)
*H04W 36/00* (2009.01)
*H04W 72/08* (2009.01)
*H04W 56/00* (2009.01)
*H04W 92/10* (2009.01)

(52) U.S. Cl.
CPC .......... *H04W 56/0015* (2013.01); *H04W 92/10* (2013.01); *H04W 72/082* (2013.01)
USPC ............................ 455/450; 455/441; 455/518

(58) Field of Classification Search
USPC ......................................... 455/450, 441, 518
See application file for complete search history.

(56) References Cited

U.S. PATENT DOCUMENTS

| | | | |
|---|---|---|---|
| 8,111,680 B2 | 2/2012 | Ijiri | |
| 2004/0116141 A1* | 6/2004 | Loven et al. | 455/519 |
| 2005/0213586 A1* | 9/2005 | Cyganski et al. | 370/395.41 |
| 2007/0064770 A1 | 3/2007 | Horiguchi | |
| 2009/0268695 A1* | 10/2009 | Zhao et al. | 370/336 |

FOREIGN PATENT DOCUMENTS

| | | |
|---|---|---|
| JP | 09-036916 | 2/1997 |
| JP | 09-261161 | 10/1997 |
| JP | 2002-510916 | 4/2002 |
| JP | 2003-009220 | 1/2003 |
| JP | 2004-220262 | 8/2004 |
| JP | 2005-009933 | 1/2005 |
| JP | 2005-309813 | 11/2005 |
| JP | 2007-088856 | 4/2007 |
| WO | WO-2006-052943 A2 | 5/2006 |
| WO | WO-2006-114838 A1 | 11/2006 |

OTHER PUBLICATIONS

ANSIII/EEE Std 802.11,1999 Edition (R2003) Information technology—Telecommunications and information exchange between systems—Local and metropolitan area networks—Specific requirements—Part I I : Wireless LAN Medium Access Control (MAC) and Physical Layer (PHY) Specifications Sponsor LAN MAN Standards Committee of the IEEE Computer Society Reaffirmed Jun. 12, 2003.

(Continued)

*Primary Examiner* — Ariel Balaoing
(74) *Attorney, Agent, or Firm* — Fujitsu Patent Center (57) ABSTRACT

A wireless base station in a wireless communication system includes a memory that stores a plurality of timing patterns that are set such that timings of using the resource are distributed for each of the mobile stations when the mobile stations change a timing of using the resource in accordance with a traveling speed and control unit that allocates one of the timing pattern to the mobile stations.

9 Claims, 10 Drawing Sheets

(56) References Cited

OTHER PUBLICATIONS

International Search Report received in corresponding application No. PCT/JP2007/061348 dated Sep. 25, 2007.

Xiang, Weidong et al., "Introduction and Preliminary Experimental Results of Wireless Access for Vehicular Environments (WAVE) Systems," Mobile and Ubiquitous Systems—Workshops, 3rd Annual International Conference, IEEE, Jul. 1, 2006, pp. 1-8, XP031089401.

Extended European Search Report dated Mar. 4, 2013 for corresponding European Application No. 07744704.3.

* cited by examiner

|  | TS #1 | TS #2 | . . . | TS #n |
|---|---|---|---|---|
| PT #1 | o | o | . . . | o |
| PT #2 | o | o | . . . | o |
| PT #3 | o | o | . . . | o |
| PT #4 | o | o | . . . | o |
| PT #5 | o | o | . . . | o |
| PT #6 | o | o | . . . | o |
| PT #7 | o | o | . . . | o |
| PT #8 | o | o | . . . | o |
| PT #9 | o | o | . . . | o |
| PT #10 | o | o | . . . | o |

WIRELESS BASE STATION AND MOBILE STATION

CROSS-REFERENCE TO RELATED APPLICATION

This application is a continuation Application of a PCT international application No. PCT/JP2007/061348 filed on Jun. 5, 2007 in Japan, the entire contents of which are incorporated by reference.

FIELD

The embodiments discussed herein are related to a wireless base station and a mobile station.

BACKGROUND

Recently, development of ITSs has been underway aiming at reduction in traffic accidents. One type of the ITSs includes wireless base stations (roadside devices) installed in or on traffic lights for roadside-vehicle communication wherein information, such as traffic light information at an intersection (e.g., whether the light is red or green) or whether there is any vehicle turning to the right is sent to a wireless terminal (hereinafter referred to as a "on-vehicle device" or "mobile station") mounted on a vehicle that is a few hundred meters from that intersection. In addition, there is another type of inter-vehicle communication in which on-vehicle devices that are separated with a smaller distance inform each other of vehicle information, such as the respective travel direction and traveling speed.

For such inter-vehicle communication, application of narrow-area ad-hoc communication based on the common wireless Local Area Network (LAN) techniques (IEEE802.11 series standards), as disclosed in Non-Patent Document 1 listed below is considered. The narrow-area ad-hoc communication in accordance with Non-Patent Document 1 is a type of communication in which mobile stations can directly communicate with each other without requiring any central control apparatus, such as a base station. Since no base stations are involved with allocating communication (wireless) resources, each mobile station manages communication resources that are employed, and carry out communication while contending each other for communication resources (hereinafter, referred to as shared resources) shared among mobile stations in a decentralized autonomous manner.

That is, each wireless terminal sends signals while monitoring a state of usage of the shared resources (frequency) by using the Carrier Sense Multiple Access (CSMA) technique so that the sending signals do not collide with each other. Furthermore, each wireless terminal waits for receiving data while it is not sending, and searches for beginnings (preambles) of signals being sent by other wireless terminals. This means that wireless terminals are not synchronized with each other. Note that IEEE 802.11 series standards indicate that cells having radii within several hundred meters are constructed as communication areas and the Orthogonal Frequency Division Multiplexing (OFDM) is employed as a modulation scheme.

Note that well-known techniques related to allocating communication resources include techniques described in Patent Documents 1 and 2 listed below.

The technique of Patent Document 1 is related to a packet relaying scheme in a wireless transmission. It is directed to providing a scheme in which reliability as a system is ensured for failure of an apparatus during relay while requiring only a single carrier for conveying wireless signals, in terms of the relaying scheme of wireless signals applied when a distance between locations of a number of sites distributed and a center for collecting information is beyond the limit of the propagation distance of wireless signals.

For this purpose, Patent Document 1 discloses that a plurality of portable terminals that transmit sensor information and monitor control information in a packet to a main terminal are linked via a linear transmission path. A time slot related to an installation location is allocated to each portable terminal, thereby permitting wireless transmission in this time span for relaying packets among portable terminals in a time division multiplexing manner as bucket brigade while relaying by bypassing an adjacent portable terminal when this terminal fails.

In addition, the technique of Patent Document 2 relates to a method for allocating wireless channels in a wireless communication system and a corresponding wireless communication system. It is directed to providing an improved method and wireless communication system for allocating wireless channels.

For this purpose, the Patent Document 2 discloses that a wireless channel in the downlink direction (tsx) is allocated to a mobile station (MS) by a wireless station (BS) depending on a channel allocation pattern (CAP) that indicates a transmission output (txp) for a time slot, and corrects the allocation of the wireless channel (tsx) by mobile station (MS) under the control of the mobile station depending on an interference pattern (IP) that indicates an interference output (inp) of the time slot.

As described above, in the technique of Patent Document 2, by carrying out allocating depending on the occupy rate of the time slots according to channel allocation patterns, it is possible to distribute the transmission output from a wireless station in the downlink direction as evenly as possible among existing time slots. By combining this feature and the fact that correction of such allocated time slots under the control of mobile stations is available (that is, correction to a time slot having a lower interference output based on the interference pattern), the shortcoming of soft handover may be avoided in the case in which the frequency repetition interval (cluster reuse) is equal to one and interferences may be problematic.

Patent Document 1: Japanese Patent Publication No. H09-36916

Patent Document 2: Japanese Translation of PCT International Application No. 2002-510916

Non-Patent Document 1: IEEE 802.11, 1999 Edition

However, none of Patent Documents teaches control on communications between mobile stations.

The related techniques described above may be problematic when the number of mobile stations is increased and thus there is not sufficient resources used for communications between mobile stations.

SUMMARY (1) According to an aspect of the embodiments, an apparatus includes a wireless base station in a wireless communication system including the wireless base station and a plurality of mobile stations which carry out communication between mobile stations with other mobile stations using a resource allocated by the wireless base station, the wireless base station including: a memory that stores a plurality of timing patterns that are set such that timings of using the resource are distributed for each of the mobile stations when the mobile stations change a timing of using the resource in accordance with a traveling speed; and control unit that allocates one of the timing patterns to the mobile stations.

(2) In addition, according to an aspect of the embodiments, an apparatus includes a mobile station in a wireless communication system in which a communication between mobile stations is carried out using a resource allocated in advance, the mobile station including: a memory that stores a plurality of timing patterns that are set such that timings of using the resource are distributed for each of the mobile stations when the mobile stations change a timing of using the resource in accordance with a traveling speed; timing pattern selection unit that autonomously selects one of the timing patterns; and communication between mobile stations control unit that carries out the communication between mobile stations in accordance with the selected timing pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described with reference drawings. It is not intended that various modifications and applications of techniques that are not explicitly described are excluded. That is, each embodiment may be varied (such as combining embodiments, for example).

Figure 1:
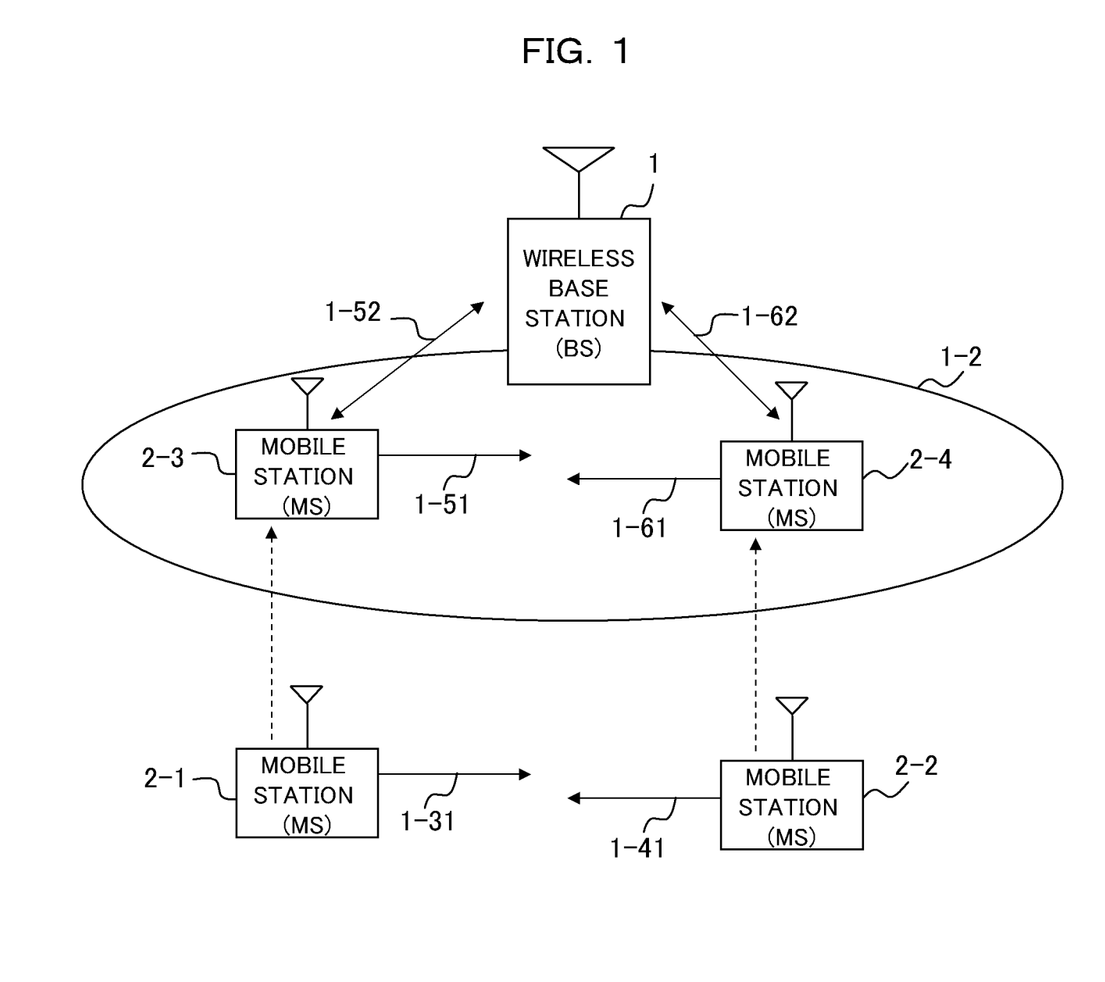
FIG. 1 is a block diagram illustrating fundamental configuration and operations of an ITS as one example of a wireless communication system according to one embodiment.

(A) Description of One Embodiment (A1) System Configuration and Fundamental Operation FIG. 1 is a block diagram illustrating fundamental configuration and operations of an ITS as one example of a wireless communication system according to one embodiment.

The ITS depicted in FIG. 1 is configured to include a wireless base station (BS) 1 as a road-side device for forming a communication area 1-2, mobile stations (MS) 2-1 and 2-2 as on-vehicle devices located outside the communication area of the BS 1 (hereinafter, referred to as wide-area communication area) 1-2, and mobile stations (MS) 2-3 and 2-4 as on-vehicle devices located within the communication area 1-2 of the BS 1. Note that the number of BSs and the number of MSs within/outside the communication area 1-2 are not limited to those depicted in FIG. 1. In addition, in the following description, the MSs 2-1, 2-2, 2-3, and 2-4 may be collectively referred to as "MS 2" when distinction among them is not necessary.

In the above ITS, the MSs 2-1 and 2-2 located outside the communication area 1-2 of the BS 1 carry out inter-MS communications 1-31 and 1-41 while autonomously selecting within a range of a resource (wireless resource (hereinafter, referred to as "resources")) that are allocated between the MS 2-1 and 2-2 in advance as shared resource. Note that the term "resource" includes time slots in the time division multiplexing scheme, frequencies in the frequency division multiplexing scheme, codes in the code division multiplexing scheme, bursts in the orthogonal frequency division multiplexing scheme (this applies throughout the entire specification).

On the other hand, the MSs 2-3 and 2-4 located within the communication area 1-2 of the BS 1 (or, the MS 2-1 and 2-2 that are migrated within the communication area 1-2) carryout communication (1-52 and 1-62) with the BS 1 (for example, transmit a resource allocation request) using a resource allocated in advance for the resource allocation request, and receives, from the BS 1, information on a resource to be used for communications (roadside-vehicle communications) with the BS 1 and information on a resource to be used for communications (inter-vehicle communications) between the MSs 2-3 and 2-4. Alternatively, among a resource to be used for roadside-vehicle communications and a resource to be used for inter-vehicle communications, the resource to be used for inter-vehicle communications may be requested, information on an allocated resource may be received from the BS 1, and inter-vehicle communications may be carried out.

Note that the MS 2-3 and the MS 2-4 respectively may receive allocation of transmission resources, carry out respective communications using the allocated resources, and communicate with each other by carrying out reception from other MSs using other times or the like.

When allocations are made for both roadside-vehicle communications and inter-vehicle communications, the MSs 2-3 and 2-4 can carry out roadside-vehicle communications (1-52 and 1-62) with the BS 1 using the resource allocated by the BS 1 while carrying out inter-vehicle communications (1-51 and 1-61) each other (and other MSs that are not depicted). Allocations of resources may be carried out by notifying of a resource to be allocated in a DL_MAP of MAP information (DL/UL_MAP) as long as a frame is any frame compliant with the Orthogonal Frequency Domain Multiple (OFDM) scheme (including the OFDMA) compliant with the WIMAX standards, for example. Alternatively, other wireless communication schemes other than the WIMAX may be used, and allocations of resources may be carried out by notifying of information on allocated resources or otherwise.

Note that in the following description, a communication (roadside-vehicle communication) between the BS 1 and an MS 2 may be referred to as a "wide-area infrastructure communication" or "wide-area communication," and a wireless resource for that communication may be referred to as a "wide-area communication resource." In addition, a communication (inter-vehicle communication) between MSs 2 may be referred to as a "narrow-area ad-hoc communication" or "narrow-area communication," and a wireless resource for that communication may be referred to as a "narrow-area communication resource."

Incidentally, when the number of MSs located within the communication area 1-2 is increased compared to the amount of narrow-area communication resources available for the communication area 1-2 of the BS 1, the BS 1 allocates a single narrow-area communication resource to a plurality of MSs 2 such that it is shared among them. Thus, when there are MSs 2 that try to carry out a narrow-area ad-hoc communication in the same cycle (timing) within the communication area 1-2, contention of the narrow-area communication resource, that is, a collision (interference) of a communication occurs.

Therefore, by setting the cycle of the narrow-area ad-hoc communication according to a traveling speed of an MS 2 (shorter cycle as the speed increases), such collision of communication may be reduced to a certain degree. However, in the case there are MSs 2 within the communication area 1-2 which are traveling at the same traveling speed, the cycle is not changed and collision of communications may be experienced unless the traveling speed is changed.

In order to avoid such a phenomenon above, the BS 1 of this example allocates different phases (transmission timings) such that communications are carried out at different times (timings) even when MSs 2 that use a narrow-area communication resource have the same status (traveling speed, for example) and carry out narrow-area ad-hoc communications at the same cycle, on the basis of setting the cycle of a narrow-area ad-hoc communication according to traveling speeds of the MSs 2.

(A2) Configuration of BS

Figure 2:
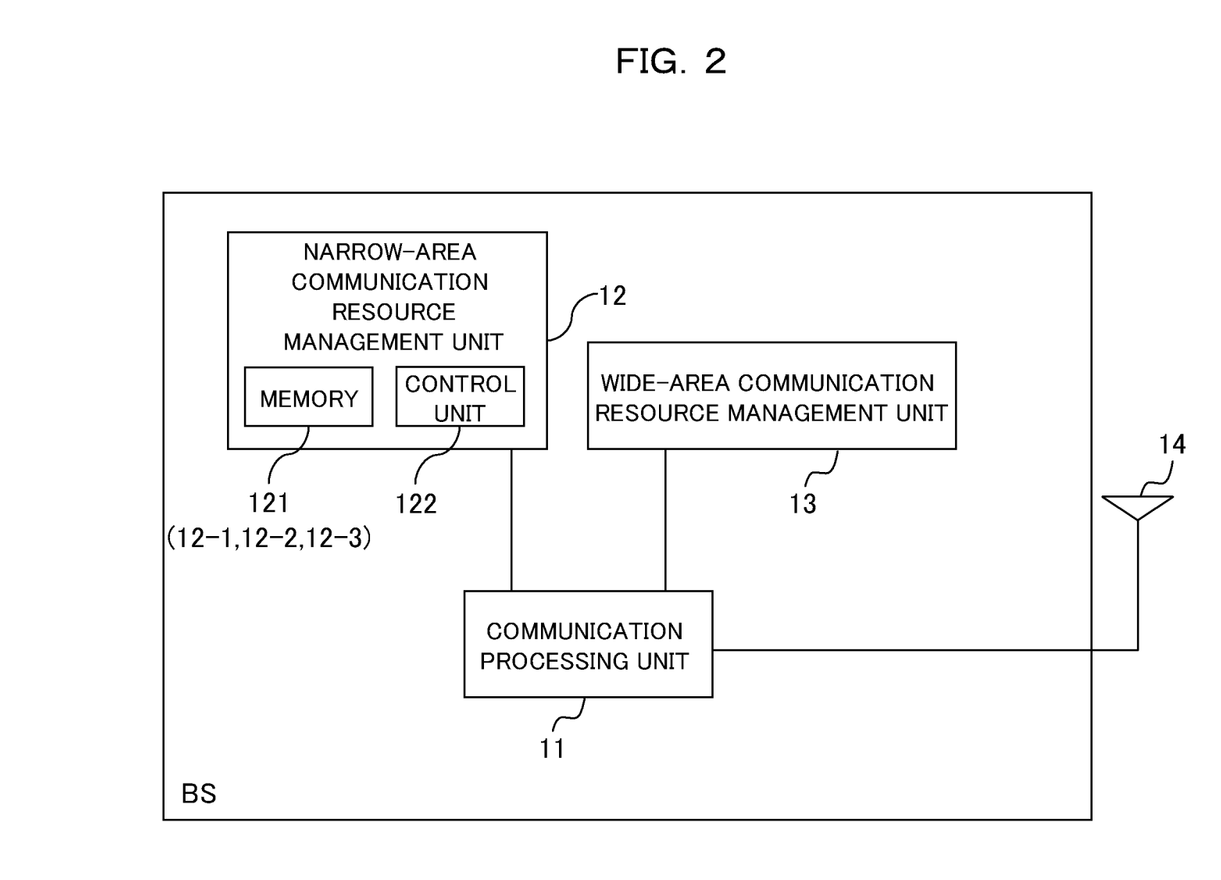
FIG. 2 is a block diagram illustrating a configuration of a wireless base station (BS) depicted in FIG. 1.

The BS 1 of this example includes, as depicted in FIG. 2, for example, a communication processing unit 11, a narrow-area communication resource management unit 12, a wide-area communication resource management unit 13, and an antenna 14.

Here, the communication processing unit 11 includes a transmission and reception function that carries out reception processing on signals received from an MS 2 via the antenna 14 and transmission processing on signals bound for the MS 2. The reception processing includes processing on signals received by the antenna 14, such as low noise amplification, a frequency conversion (downconversion), an AD conversion, demodulation, decoding, and the transmission processing includes processing on transmission information, such as coding, modulation, a DA conversion, a frequency conversion (upconversion), and high power amplification.

In addition, the transmission processing includes processing for transmitting synchronization signal 8-1 and a synchronization signal number that is incremented every time the synchronization signal 8-1 is transmitted which will be described later with reference to FIG. 5, and processing for generating and transmitting a wireless frame (base frame) at a timing synchronized with that synchronization signal 8-1 such that an MS 2 within the communication area 1-2 can communicate with the BS 1 and other MSs 2.

The narrow-area communication resource management unit 12 is equipped with a function that manages availabilities of narrow-area communication resources and manages allocation status of phases allocated to MSs 2 for each narrow-area communication resource, and carries out allocation processing and deallocation processing of narrow-area communication resources and phases in response to requests from the communication processing unit 11.

For this purpose, the narrow-area communication resource management unit 12 includes a transmission cycle table 12-1 and a phase table 12-2 which will be descried later with reference to FIG. 4, a memory 121 for storing a narrow-area communication resource/a transmission pattern management table 12-3 which will be descried later with reference to FIG. 7, and a control unit 122 that carries out the allocation processing and the deallocation processing narrow-area communication resources and phases based on the contents stored on the memory 121.

The wide-area communication resource management unit 13 includes a function that manages availabilities of wide-area communication resources, and carries out allocation processing and deallocation processing of wide-area communication resources in response to requests from the communication processing unit 11.

The antenna 14 includes a transmission and reception function of wireless signals with MSs 2 within the communication area 1-2. Note that the communication processing unit 11 may be connected to a communication processing unit 11 of another BS 1 or a server apparatus or the like that contains various information, although not depicted in FIG. 2.

(A3) Configuration of MS

Figure 3:
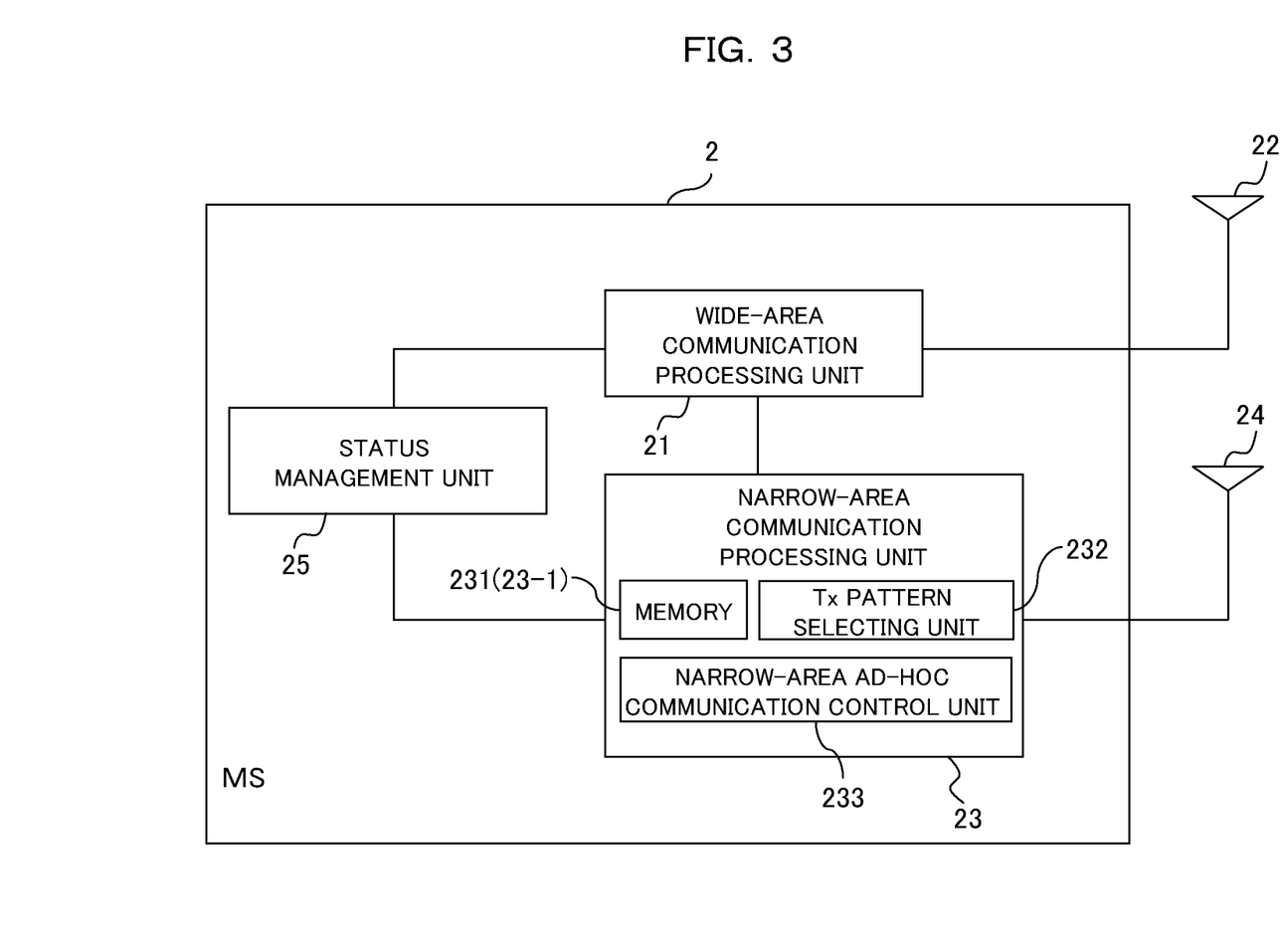
FIG. 3 is a block diagram illustrating a configuration of a mobile station (MS) depicted in FIG. 1.

On the other hand, MS 2 includes a wide-area communication processing unit 21, a wide-area communication antenna 22, a narrow-area communication processing unit 23, a narrow-area communication antenna 24, and a status management unit 25, as depicted in, for example, FIG. 3.

Here, the wide-area communication processing unit 21 includes a function that carries out a wide-area infrastructure communication with the BS 1 via the wide-area communication antenna 22 in synchronized with a synchronization signal from the BS 1 in the communication area 1-2 of the BS 1, and notifies the narrow-area communication processing unit 23 of the allocation information on narrow-area communication resource from the BS 1.

The narrow-area communication processing unit 23 is adapted to carry out a narrow-area ad-hoc communication with other MSs 2 via the narrow-area communication antenna 24. The narrow-area communication processing unit 23 includes a function that carries out a narrow-area ad-hoc communication with one other MS 2 while autonomously selecting the narrow-area communication resource that has been allocated in advance when the local MS 2 is outside the communication area 1-2 of the BS 1, and carries out a narrow-area ad-hoc communication (transmission) according to allocation information of a narrow-area communication resource and a phase specified by the wide-area communication processing unit 21 when the local MS 2 is located within the communication area 1-2 of the BS 1.

The narrow-area communication processing unit 23 includes a memory 231 that stores a phase table 23-1 that is similar to the phase table 12-2 owned by the BS 1 side, a transmission pattern selection unit 232 that selects one of transmission patterns (timing patterns) in the phase table 12-2 according to an instruction from the BS 1, and a control unit 233 that carries out a narrow-area ad-hoc communication (transmission) and a narrow-area ad-hoc communication (inter-MS communication) according to the selected transmission pattern. Note that, as for reception, the MS 2 is preferably ready at anytime to receive a transmission signal using a narrow-area communication resource from one other MS 2.

The status management unit 25 includes a function to manage status information of the local MS 2, such as the traveling speed (vehicle speed) of the local MS 2, and notify the narrow-area communication processing unit 232 of the status information in response to a request from the narrow-area communication processing unit 23 or in a certain cycle. The traveling speed may be detectable using a vehicle speed sensor installed in a vehicle, for example.

Note that the wide-area communication antenna 22 and the narrow-area communication antenna 23 are depicted as being discrete elements in FIG. 3. However, if it is possible to integrate the functions of the two antennas 22 and 23, for some reasons, such as the same radio frequency band is used for a wide-area communication and a narrow-area communication, the wide-area communication processing unit 21 and the narrow-area communication processing unit 23 may be configured to share one antenna.

(A4) Information on Transmission Cycle and Phase

Figure 4:
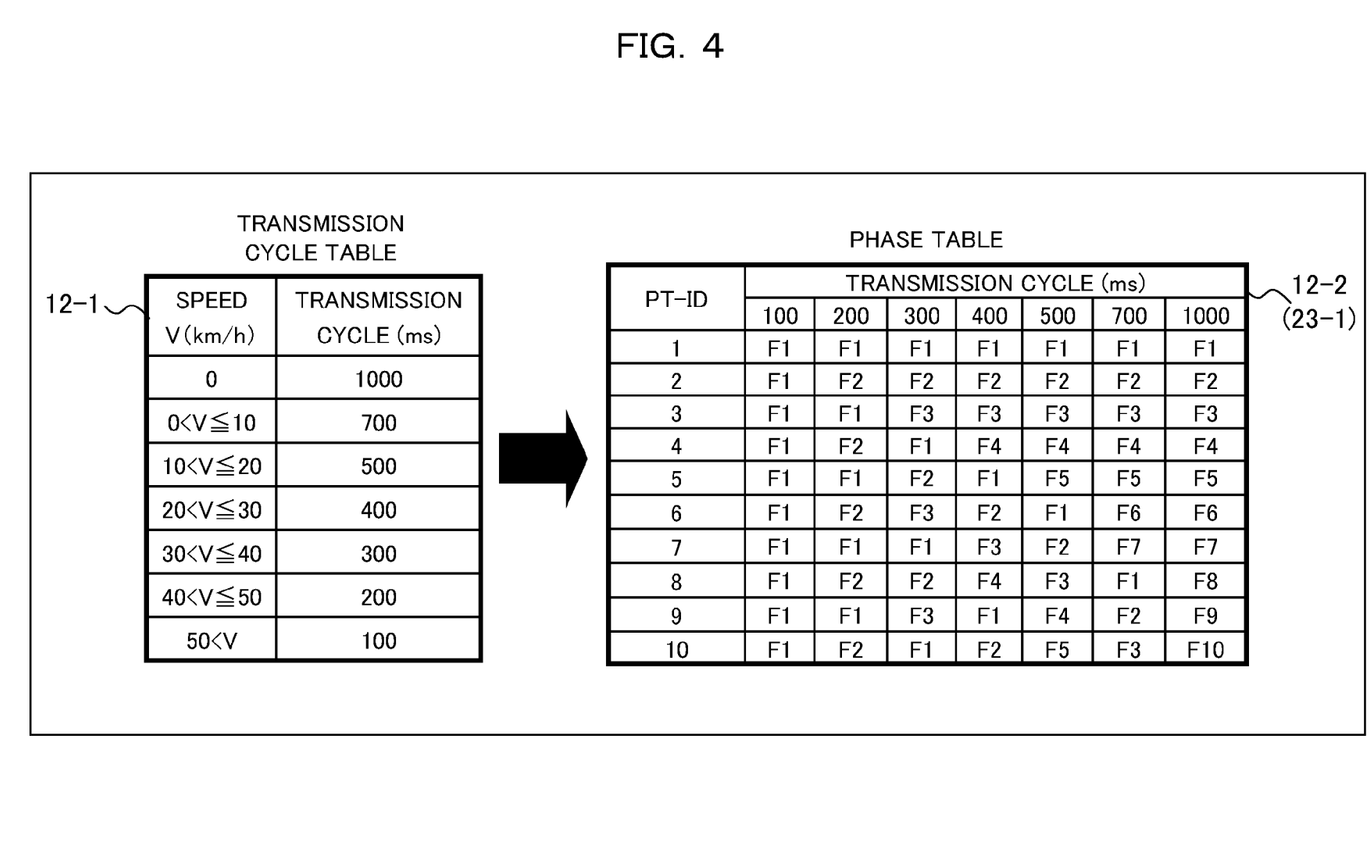
FIG. 4 is a diagram illustrating one example of a transmission cycle table and a phase table managed by the BS depicted in FIG. 2, and a phase table managed by the MS depicted in FIG. 3.

Next, the relationship between the status of an MS 2 and the cycle of a narrow-area ad-hoc communication (transmission cycle), and the relationship of phase information derived from that relationship is illustrated in FIG. 4. In FIG. 4, the transmission cycle table 12-1 indicates that the relationship between the traveling speed (that is exemplified by the traveling speed of an MS 2 as a factor to determine the cycle of narrow-area ad-hoc communications) and the transmission cycle of narrow-area ad-hoc communications. It is indicated that the transmission cycle is reduced as the traveling speed of the MS 2 increases.

That is, in the transmission cycle table 12-1, the transmission cycle is 1000 ms (i.e., 1 second) when the traveling speed V of the MS 2 detected by a sensor or the like is 0 km/h (stopped status); the transmission cycle is 700 ms when 0 km/h<V≤10 km/h; the transmission cycle is 500 ms when 10 km/h<V≤20 km/h; the transmission cycle is 400 ms when 20 km/h<V≤30 km/h; the transmission cycle is 300 ms when 30 km/h<V≤40 km/h; the transmission cycle is 200 ms when 40 km/h<V≤50 km/h; and the transmission cycle is 100 ms when 50 km/h<V.

The phase table 12-2 is generated based on the transmission cycle table 12-1. The specific procedure for the generation will be described. Firstly, since it is known from the transmission cycle table 12-1 that the minimum value of the transmission cycle is 100 ms and the maximum value is 1000 ms, a narrow-area communication resource is configured from a base frame 8-2 of 100 ms and a super frame of 1000 ms is configured 10 base frames 8-2 (#i), as depicted in FIG. 5, for example. Note that "i" indicates a base frame number (identifier), and "i" is one of integers from 1 to 10. In FIG. 5, a non-transmitting period, such as a guard interval, is provided in the base frame 8-2.

That is, synchronization signals 8-1 transmitted by the BS 1 includes synchronization signal numbers, the beginning of each base frame 8-2 having a length of 100 ms is defined at the timing in synchronized with that synchronization signal. Furthermore, a super frame having a length of 1000 ms is defined by repetition of 10 base frames 8-2. Note that the synchronization signal 8-1 and the base frame 8-2 is generated at the communication processing unit 11 of the BS 1.

The synchronization signal number employed is determined based on the transmission cycles described in the transmission cycle table 12-1. In the case of the transmission cycle table 12-1, an integer obtained by dividing each by the length of base frame time (100 ms) which ranges from 1 to 420, the maximum value of 420 being the least common multiple of 1, 2, 3, 4, 5, 7, and 10. Each MS 2 determines which base frame 8-2 is to be transmitted (transmission timing phase) on the basis of the base frame number 1 (F1), and carries out transmission using the determined transmission timing.

In addition, each base frame #i are further divided into finer time slots 8-3 (TSs #1-#n), and one time slot TS #j defined within one base frame #i is allocated to each MS 2 from the BS 1 as a narrow-area communication resource. Note that "j" indicates time slot number (identifier), and j is one of integer from 1 to n. For example, when an MS 2 travels at V>50 km/h and carries out a narrow-area ad-hoc communication at 100 ms, the MS 2 will carry out transmission using the allocated time slot TS #j at every base frame #1 to #10.

Figure 5:
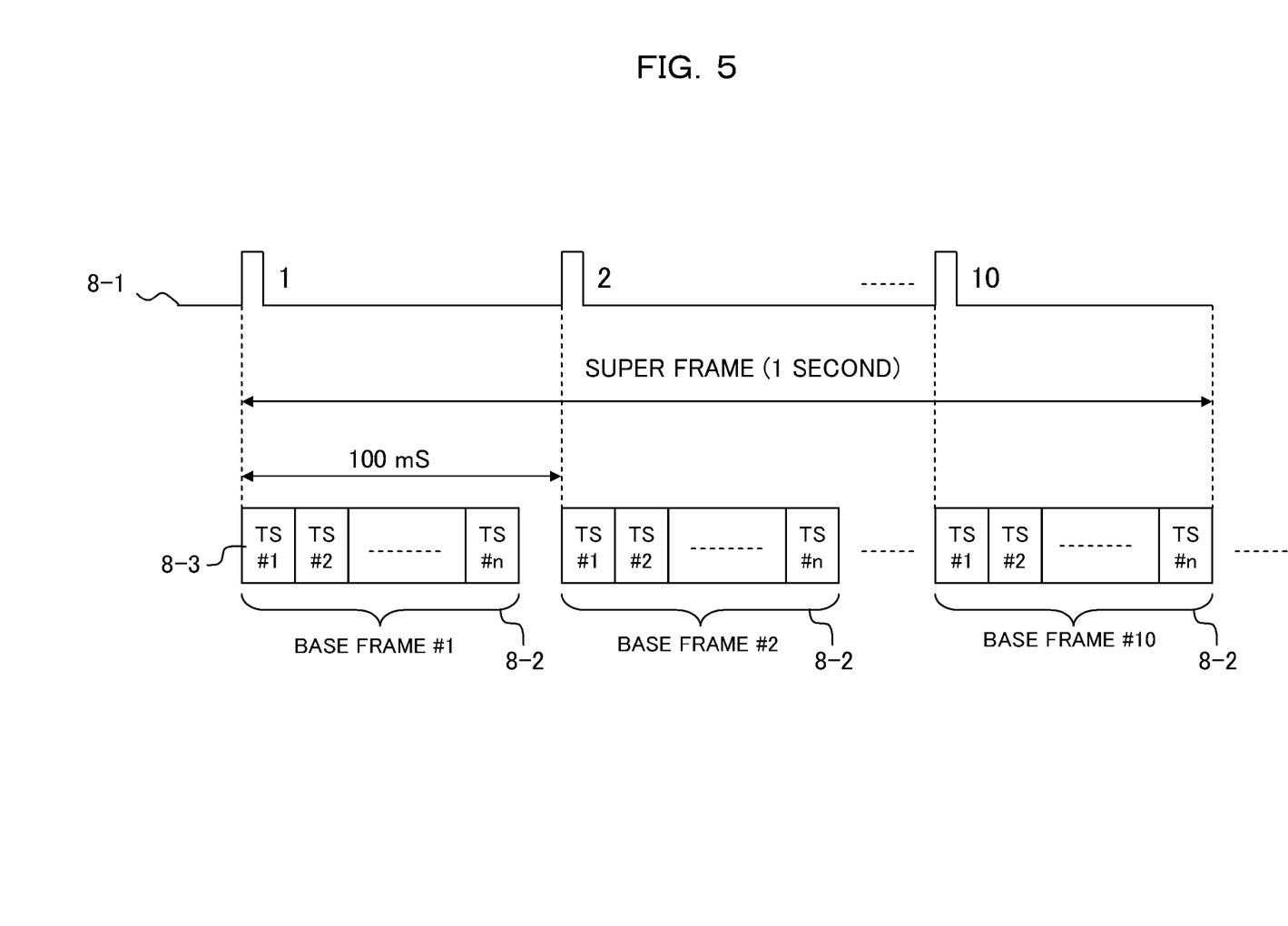
FIG. 5 is a diagram illustrating an example of the frame configuration of a narrow-area communication resource used by the ITS depicted in FIG. 1.

Note that, although FIG. 5 illustrates an example in which a narrow-area communication resource is time division multiplexed, frequency division multiplexing, code division multiplexing, or the like may be applied. In addition, a base frame #i may have a frame length shorter than 100 ms. Furthermore, although the synchronization signal 8-1 is transmitted by the BS 1 at every base frame #i, the BS 1 may transmit synchronization signals at every base frames #i, or other signal sent from other systems, such as a global positioning system (GPS) may be used as synchronization signals.

Here, according to the frame configuration of the narrow-area communication resource depicted in FIG. 5, a certain time slot number j appears ten times within a super frame of 1000 ms (this means that there are ten opportunities of transmission). Here, assuming the case in which the transmission cycle is set to the longest value of 1000 ms, it is possible to avoid collision of narrow-area ad-hoc communications by allocating a different base frame number Fi to each MS 2 as a phase (transmission timing phase) if the number of MSs 2 sharing a single time slot number j is ten or less since only one of ten slots is required for a transmission.

As described above, the number of MSs for which any collision can be completely avoided by displacing phase (the base frame number Fi) is (the transmission cycle/the length of base frame time) when the same time slot number j is used. The phase table 12-2 includes various combinations of phases in each transmission cycle as transmission patterns when the number of MSs using the same time slot number j is equalized.

As described above, the efficiency of resource utilization of communications between MSs 2 can be improved by allocating, by the BS 1, phases such that frequencies of usage of respective phases in a predetermined phase group is equalized when allocating phases to group of MSs 2 that use a part of the same narrow-area communication resource. Note that definition that gives biases in usage may be made, other than the equalization as described above.

In other words, the phase table 12-2 defines a plurality of timing patterns (patterns of timing phases) that are defined such that each timing for each MS 2 is dispersed upon the MS 2 when the timing for using a narrow-area communication resource is changed according to the traveling speed thereof, more specifically, defines patterns of a plurality of timing phases having different phases of usage cycles for a plurality of MSs 2 having their usage cycles of narrow-area communication resources matched according to the traveling speeds of the MSs 2.

The BS 1 allocates one of the phases (phase combination) indicated by a transmission pattern ID (PT-ID) in the phase table 12-2, and transmits the allocated PT-ID to an MS 2. Since the MS 2 which received the allocated PT-ID has the phase table 23-1 that is the same as the phase table 12-2 on the BS 1 side in the memory 231 (the MS 2 may appropriately receive one from a road-side device side, or the PT-ID may include information on a transmission timing phase for each transmission cycle where necessary), the MS 2 determines (selects), in a transmission cycle that is decided according to the detection result of a sensor or the like in the local the traveling speed of the MS 2, which phase (base frame number Fi indicating the initiation timing of the transmission cycle) is to be used for narrow-area ad-hoc communication by looking for the received PT-ID based on the phase table 23-1.

Figure 6:
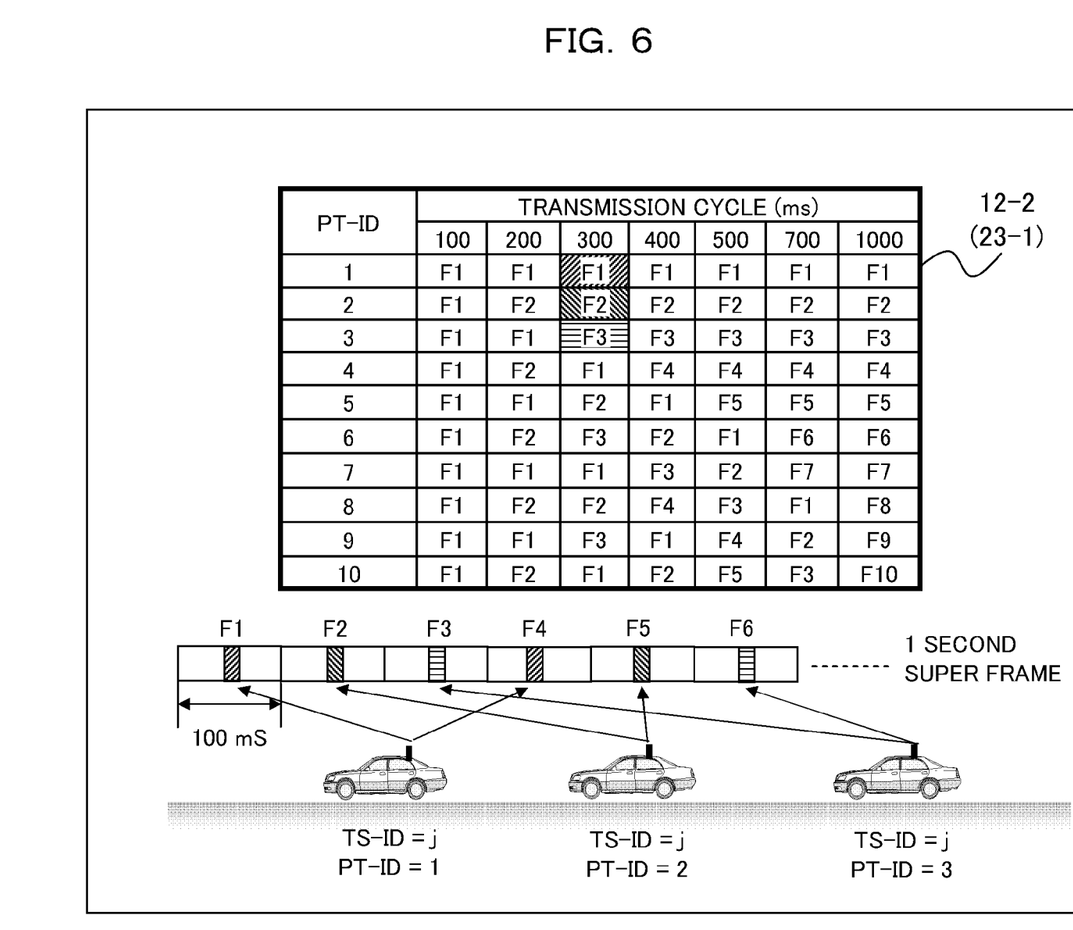
FIG. 6 is a diagram illustrating the operation of the ITS depicted in FIG. 1.

As depicted specifically in FIG. 6, for example, when three MSs 2 having a time slot identifier (TS-ID)=j and transmission pattern identifiers (PT-ID)=1, 2, and 3 are present within the communication area 1-2 of the BS 1, transmission timing phases are dispersed and no collision of narrow-area ad-hoc communications occurs even if the transmission cycles depending on the traveling speed of the MSs 2 become all 300 ms.

That is, since the MS 2 having its allocated PT-ID=1 carries out transmission at a cycle of 300 ms as an initial phase using the time slot TS #j of TS-ID=j of the base frame number=F1, the MS 2 having its allocated PT-ID=2 carries out transmission at a cycle of 300 ms as an initial phase using the time slot TS #j of TS-ID=j of the base frame number=F2. Similarly, since the MS 2 having its allocated PT-ID=3 carries out transmission at a cycle of 300 ms as an initial phase using the time slot TS #j of TS-ID=j of the base frame number=F3, no collision of narrow-area ad-hoc communications occurs.

Note that the BS 1 maintains the above-described transmission cycle table 12-1 and the phase table 12-2 in the memory 121 of the narrow-area communication resource management unit 12 depicted in FIG. 2 as tabular form data, and an MS 2 maintains the phase table 23-1 that is the same as the phase table 12-2 stored by the BS 1 the memory 231 of the narrow-area communication processing unit 23 depicted in FIG. 3 as tabular form data.

Figure 7:
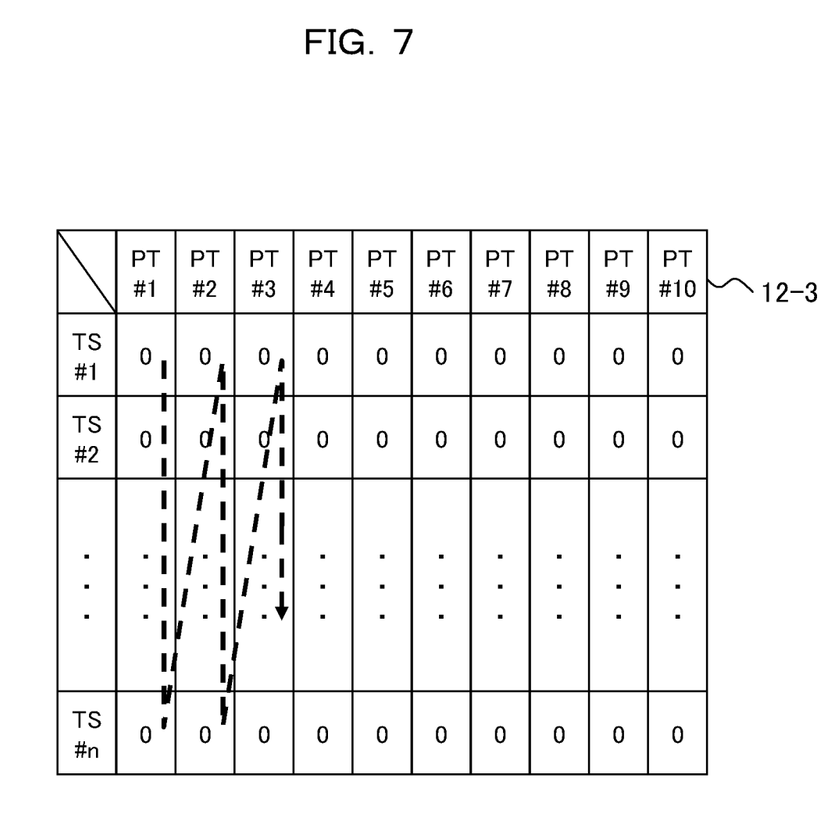
FIG. 7 is a diagram illustrating one example of a narrow-area communication resource/transmission pattern management table managed by the BS depicted in FIG. 2.

(A5) Allocation Processing of Narrow-Area Communication Resource and Transmission Pattern The narrow-area communication resource management unit 12 of the BS 1 maintains the narrow-area communication resource/the transmission pattern management table 12-3 as depicted in FIG. 7 in the above-described memory or the like, and carries out allocation processing of narrow-area communication resources (time slots) and transmission patterns based on the management table 12-3.

Here, the vertical axis of the management table 12-3 represents time slot identifiers (TS-ID=TS#1-TS#n) defined in base frames #i, the horizontal axis represents transmission pattern identifiers (PT-ID=PT#1-PT#10), and the intersections contain numbers of MSs using the time slot TS #j identified by the corresponding TS-ID and the transmission pattern by the PT-ID.

That is, when the narrow-area communication resource management unit 12 in the BS 1 receives a narrow-area communication resource allocation request from an MS 2, time slots to be allocated and transmission patterns are searched from the top left of the management table 12-3 in FIG. 7 to the direction indicated by the dotted direction. The logic of the search is as follows:

(1) If there is an unallocated time slot TS #j, the time slot TS #j (and PT#1) are allocated.

(2) If there is no unallocated time slot TS #j, an unallocated transmission pattern PT#i among allocated time slots TS #j is allocated.

(3) If there is no unallocated transmission pattern PT#i, the transmission pattern PT#i that has been allocated to the smallest number of MSs among allocated transmission patterns PT#i is allocated.

(4) Once the combination of time slot TS #j to be allocated and the transmission pattern PT#i is determined, the value in the field of that combination is incremented by one.

When an MS 2 leaves the communication area 1-2 of the BS 1 and the combination of the time slot TS #j and the transmission pattern PT#i is not used, the value in the field of that combination in the management table 12-3 is decremented by one.

Note that further information may be added to the information in the management table 12-3 depicted in FIG. 7 in order to speed up such search processing.

When the narrow-area communication resource management unit 12 recognizes that there are multiple MSs 2 that use a certain one time slot TS#2 in the course of the allocation processing of a time slot TS #j and a transmission pattern PT#i described above, the narrow-area communication resource management unit 12 instructs the MSs 2 that use the time slot TS#2 to initiate a cycle control of the narrow-area ad-hoc communication according to the traveling speeds.

That instruction includes that TS-ID (#2), and is notified to the MSs 2 by means of broadcast-type communication within the communication area 1-2, for example. Alternatively, it is possible to notify the individual targeted MSs 2 of the TS-ID (#2) by maintaining identification information of the MSs 2 that carryout a narrow-area ad-hoc communication within the communication area 1-2.

In addition, when the number of MSs 2 that uses a certain one time slot TS #j is reduced to one for some reasons, such as a certain MS 2 having moved outside the communication area 1-2, the MS 2 is instructed to terminate the cycle control of the narrow-area ad-hoc communication according to the traveling speed. That instruction may be carried out in the same manner as the initiation instruction of the above-described cycle control.

For the cycle control according to the statuses of MSs 2 of narrow-area ad-hoc communication, a cycle control may be carried out constantly irrespective of the usage situation of time slots TS #j, rather than the BS 1 instructing dynamically to initiate/terminate a cycle control according to the usage situation of time slots TS #j as in the manner described above.

With the configuration descried above, the BS 1 can notify MSs 2 in advance of information indicating a pattern of transmission timing phase in a wireless frame that is used when transmission cycle is changed. The MSs 2 can make a change for increasing a length of the transmission cycle when the traveling speed is decreased based on the information notified in advance, identify the transmission timing phase corresponding to the transmission cycle after the change, and carry out transmission using that transmission timing phase.

(A6) Description of Operation of BS

Figure 8:
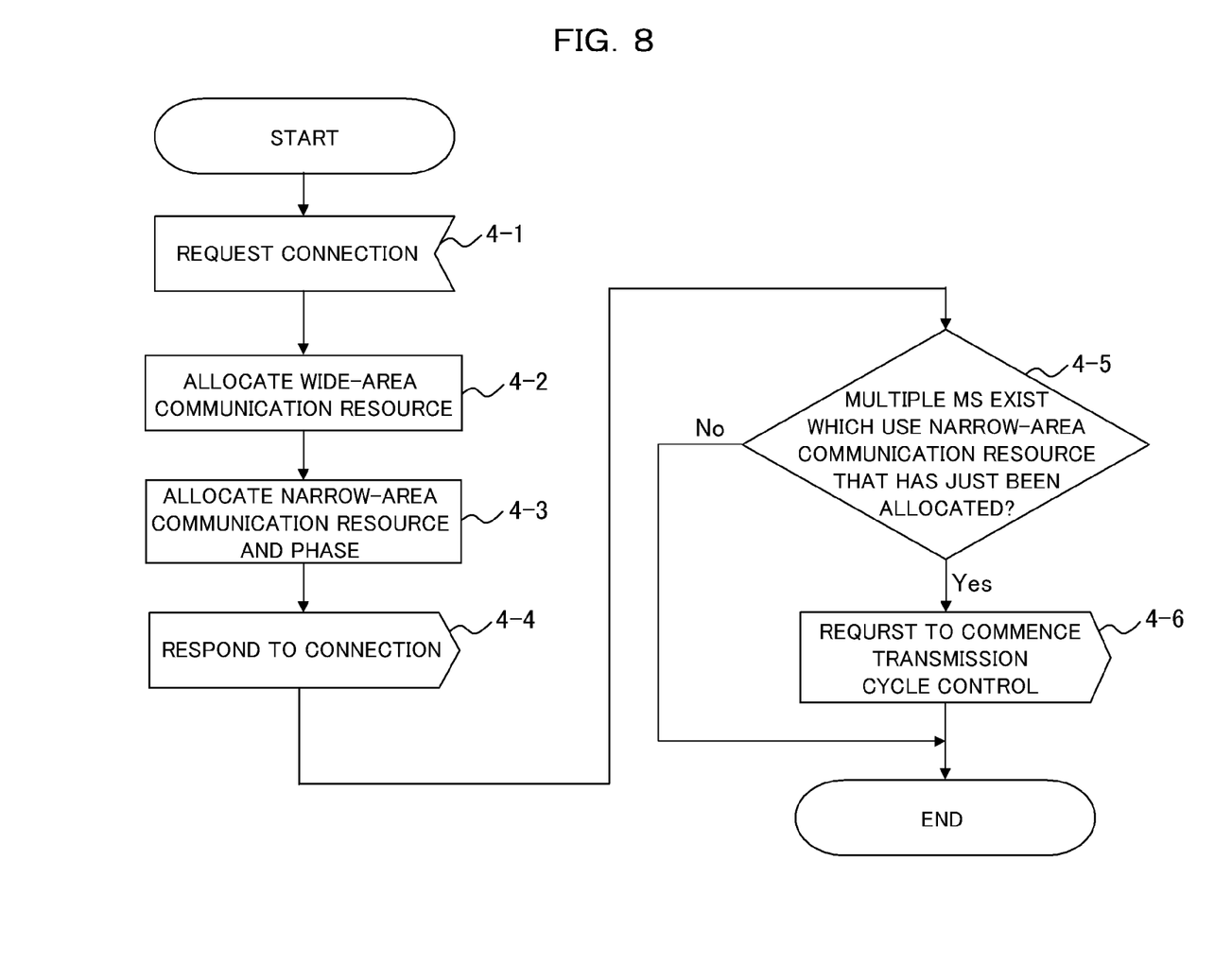
FIG. 8 is a flowchart illustrating the operation (connection processing procedure) of the BS depicted in FIG. 2.
Figure 9:
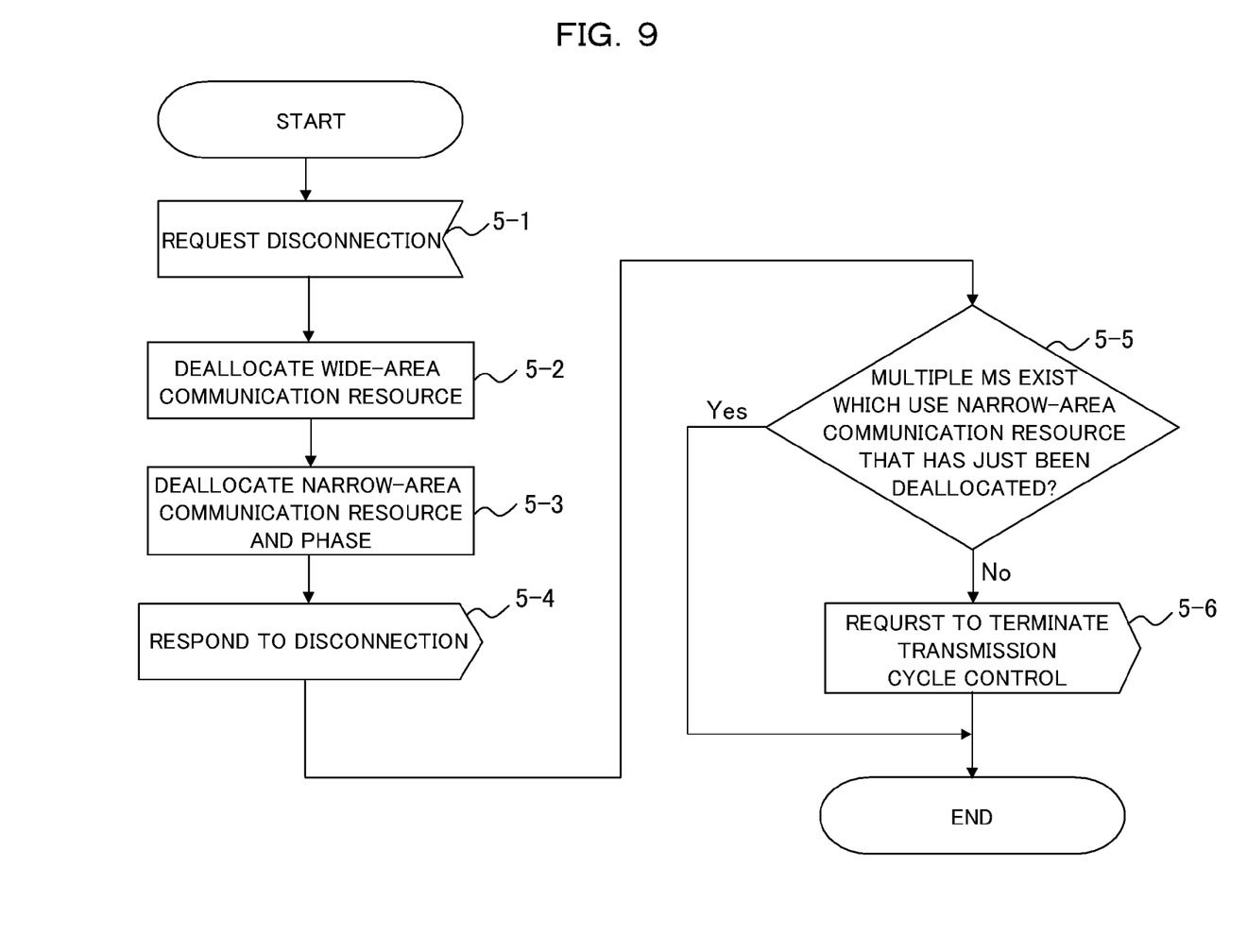
FIG. 9 is a flowchart illustrating the operation (disconnection processing procedure) of the BS depicted in FIG. 2.

Next, on the basis of the above description, operations of the BS 1 will be described with reference to the flowcharts depicted in FIG. 8 and FIG. 9. FIG. 8 illustrates a processing sequence when the BS 1 receives a connection request from an MS 2, and FIG. 9 illustrates a processing sequence when the BS 1 receives a disconnection request from an MS 2.

(Upon Reception of Connection Request)

As depicted in FIG. 8, when the communication processing unit 11 of the BS 1 receives a connection request from an MS 2 (Step 4-1), the communication processing unit 11 requests the wide-area communication resource management unit 13 to allocate a wide-area communication resource (Step 4-2) and requests the narrow-area communication resource management unit 12 to allocate a narrow-area communication resource and a phase.

When the wide-area communication resource management unit 13 receives the above-described request from the communication processing unit 11, the wide-area communication resource management unit 13 determines the wide-area communication resource to be allocated to the MS 2 that made the connection request. On the other hand, when the narrow-area communication resource management unit 12 (control unit 122) receives the above-described request from the communication processing unit 11, as described above with reference to FIG. 7 on the basis of the management table 12-3, the narrow-area communication resource management unit 12 carries out allocation processing of a narrow-area communication resource (time slot) and a phase (transmission pattern, pattern of transmission timing phase) (Step 4-3).

Once the allocation processing above is completed, the communication processing unit 11 transmits a connection response to the MS 2 that made the connection request (Step 4-4). Inclusion of a PT-ID in the connection response enables the MS 2 to identify a particular transmission pattern in the phase table 23-1 to be used for carrying out a narrow-area ad-hoc communication when transmission cycle is modified.

Thereafter, the narrow-area communication resource management unit 12 determines whether or not there are multiple MSs 2 that use the same narrow-area communication resource (time slot number j) as the narrow-area communication resource (time slot number j) allocated in the above-described allocation processing based on the management table 12-3 (Step 4-5).

When it is determined that there are multiple MSs 2 as a result of the determination, the narrow-area communication resource management unit 12 requests the MSs 2 using the same time slot number j to initiate a transmission cycle control based on the statuses of the MSs 2 and the phase allocated by the BS 1 via the communication processing unit 11 (Yes route from Step 4-5 to Step 4-6). Note that the above TS-ID may be included in the initiation request. On the other hand, when there are not multiple MSs 2, the processing is terminated and reception of another connection request is waited (No route of Steps S4-5).

(Upon Reception of Disconnection Request)

On the other hands, the communication processing unit 11 of the BS 1 receives a disconnection request from an MS 2 (Step 5-1), the communication processing unit 11 requests the wide-area communication resource management unit 13 to deallocate a wide-area communication resource (Step 5-2) and requests the narrow-area communication resource management unit 12 to deallocate a narrow-area communication resource and a phase (Step 5-3). Inclusion of a phase (PT-ID) allocated from the BS 1 in this deallocation request enables the BS 1 to identify the narrow-area communication resource (time slot) and the phase (transmission pattern) to be deallocated.

When the wide-area communication resource management unit 13 receives the deallocation request from the communication processing unit 11, the wide-area communication resource management unit 13 carries out deallocation processing of the corresponding wide-area communication resource. In addition, the narrow-area communication resource management unit 12 carries out deallocation processing of the corresponding narrow-area communication resource (time slot number j) and the phase using the search logic for the management table 12-3 that has been described above with reference to FIG. 7 based on the PT-ID received from an MS 2 (Step 5-3).

Once that deallocation processing is completed, the communication processing unit 11 transmits a disconnection response to the MS 2 that made the disconnection request (Step 5-4).

Thereafter, the narrow-area communication resource management unit 12 determines whether or not there are multiple MSs 2 that use the deallocated narrow-area communication resource (time slot number j) (Step 5-5). When there are not multiple MSs 2, the narrow-area communication resource management unit 12 requests the MS 2 that uses the time slot number j to terminate the transmission cycle control based on the status of the MS 2 and the phase allocated by the BS 1 (from No route of Step 5-5 to Step 5-6), and terminates the processing and waits for another disconnection request when there are multiple MSs 2 (Yes route of Step 5-5).

Note that, when no MS 2 uses deallocated narrow-area communication resource in the above-described Step 5-6, Step 5-6 (termination request of transmission cycle control) may not be carried out. In addition, following this deallocation procedure, if there are multiple MSs 2 that use a certain one narrow-area communication resource that is different from the one that has just been deallocated, the narrow-area communication resource deallocated in the above procedure may be allocated to such multiple MSs 2. Note that, following this procedure, the BS may reallocate narrow-area communication resources and PT-IDs that have been allocated to the MSs, thereby equalizing the frequency of use of the narrow-area communication resources and the PT-IDs.

(A7) Description of Operation of MS

Figure 10:
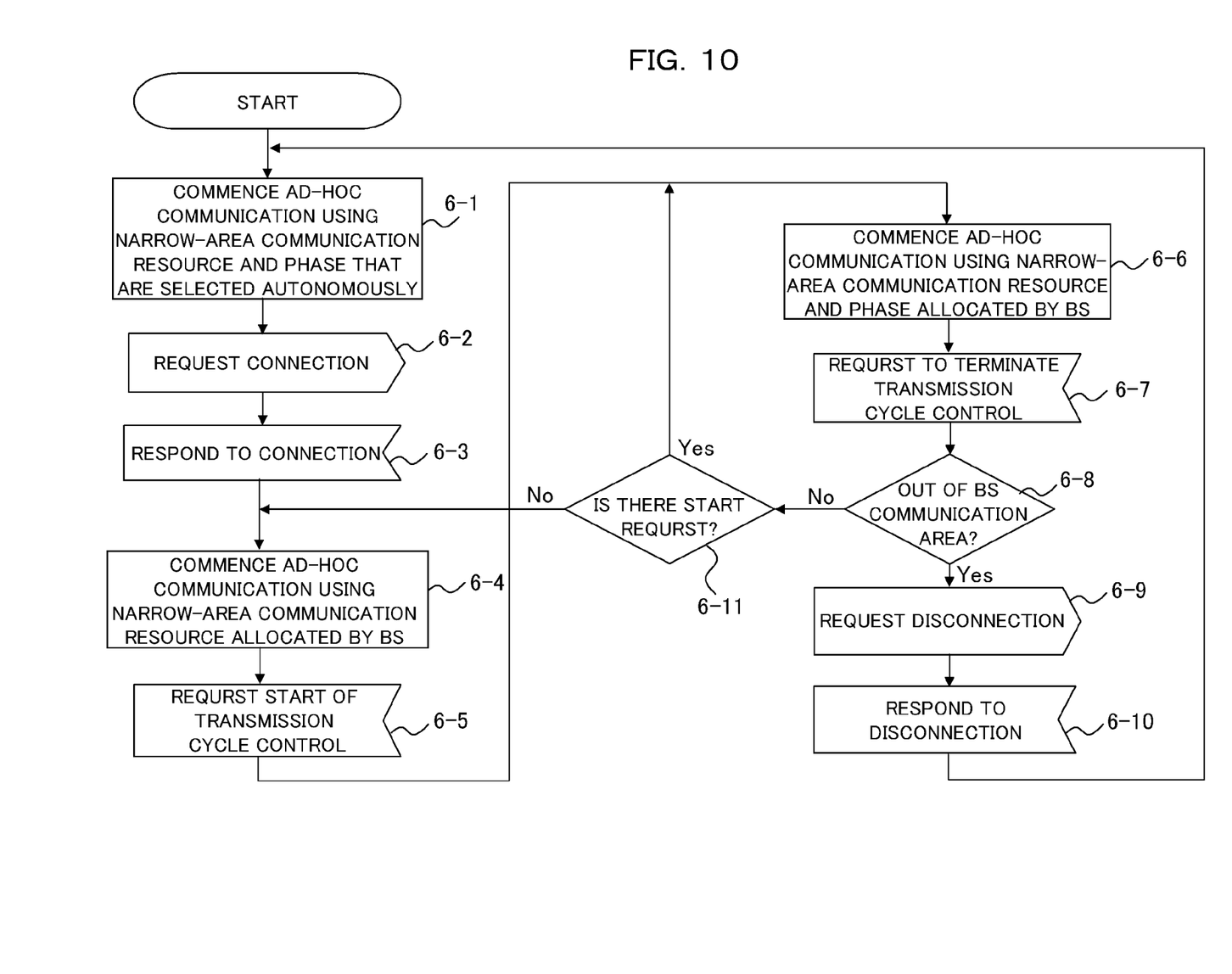
FIG. 10 is a flowchart illustrating the operation of the MS depicted in FIG. 3.

On the other hand, as depicted in FIG. 10, when an MS 2 is turned on and the wide-area communication processing unit 21 does not receive a signal from the BS 1, the narrow-area communication processing unit 23 autonomously selects a narrow-area communication resource and a phase and initiates a narrow-area ad-hoc communication based on the status of the local MS 2 notified by the status management unit 25 (Step 6-1). In Step 6-1, the MS 2 selects a narrow-area communication resource and a phase at random from a known group of narrow-area communication resources and a phase group that have been allocated in advance.

When the MS 2 moves and the wide-area communication processing unit 21 receives a signal from the BS 1, the wide-area communication processing unit 21 transmits a connection request to the BS 1 (Step 6-2). When the MS 2 receives a connection response to that connection request at the wide-area communication processing unit 21, the MS 2 notifies the narrow-area communication processing unit 23 of allocation information of the narrow-area communication resource allocated by the BS 1 (TS-ID) by means of that connection response (Step 6-3).

The narrow-area communication processing unit 23 initiates a narrow-area ad-hoc communication based on the notified allocation information using the narrow-area communication resource allocated by the BS 1 (Step 6-4). In this case, the transmission cycle can be regarded as 100 ms, for example, irrespective of the speed.

Thereafter, when the wide-area communication processing unit 21 receives an initiation request for a transmission cycle control from the BS 1 (Step 6-5), the wide-area communication processing unit 21 notifies the narrow-area communication processing unit 23 of that initiation request. In the case in which the connection response does not include any PT-ID, the narrow-area communication processing unit 23 autonomously selects a PT-ID and looks up (searches) the management table 23-1 based on the autonomously selected PT-ID and the status (speed) the local MS 2 notified by the status management unit 25. Thereby, the narrow-area communication processing unit 23 identifies the narrow-area communication resource and the phase for a narrow-area ad-hoc communication and carries out the narrow-area ad-hoc communication using the narrow-area communication resource and the phase that are identified.

On the other hand, in the case in which a PT-ID is included in the connection response, the narrow-area communication processing unit 23 will carry out the narrow-area ad-hoc communication the transmission cycle and phase according to the traveling speed using that transmission pattern (Step 6-6).

Note that the control described in the description of Step 6-6 may be carried out without waiting for an initiation request.

Thereafter, when the wide-area communication processing unit 21 receives a termination request for a transmission cycle control from the BS 1, the wide-area communication processing unit 21 notifies the narrow-area communication processing unit 23 of that termination request, and the narrow-area communication processing unit 23 terminates the transmission cycle control based on the status of the local MS 2 (Step 6-7). In addition, the wide-area communication processing unit 21 determines whether or not the local MS 2 is leaving out of the communication area 1-2 of the BS 1 by receiving the termination request, from the status of radio waves from the BS 1, the location information or the traveling direction of the local MS 2 measured by a GPS, or the like (Step 6-8).

When it is determined that the local MS 2 is leaving out of the communication area 1-2 as a result of the determination, the wide-area communication processing unit 21 transmits a disconnection request to the BS 1 (Yes route from Step 6-8 to Step 6-9), and carries out processing following Step 6-1 after receiving a response thereto (Step 6-10). On the other hand, when the local MS 2 is not leaving out of the communication area 1-2 of the BS 1 (when No in Step 6-8), the wide-area communication processing unit 21 determines whether or not an initiation request for a transmission cycle control has been received and the narrow-area communication processing unit 23 has initiated a transmission cycle control (Step 6-11).

The narrow-area communication processing unit 23 has initiated a transmission cycle control (when Yes in Step 6-11), the processing following Step 6-6 is carried out. Otherwise (when No in Step 6-11), the processing following Step 6-4 is carried out.

Note that the above processing sequence is terminated when the MS 2 is turned off, although this is not depicted in the processing sequence in FIG. 10.

In addition, in this example, although an MS 2 determines whether or not the MS 2 is leaving out of the communication area 1-2 of the BS 1, such a determination may be difficult to be made depending on the status of radio waves from the BS 1 and the MS 2 may leave from the communication area 1-2 of the BS 1 without being able to send a disconnection request to the BS 1.

In order to address such a case, a configuration is possible in which the BS 1 and MSs 2 periodically carry out communications with each other for ensuring that the BS 1 and the MSs 2 can communicate with each other. When it is detected that communication is no more available with one MS 2, the BS 1 may terminate communication with the MS 2 and deallocate the narrow-area communication resource and the phase that are allocated to the MS 2. The MS 2 may terminate the communication with the BS 1, and autonomously select a narrow-area communication resource for carrying out a narrow-area ad-hoc communication.

As described above, according to this embodiment, when an MS 2 changes the cycle of a narrow-area ad-hoc communication that is carried out using a narrow-area communication resource allocated by the BS 1 according to the status of each MS 2 (traveling speed), the BS 1 instructs each MS 2 to shift the phase (frame number) of the communication cycle of each MS 2 with respect to each other by allocating a PT-ID (that is, transmission pattern (pattern of transmission timing phase)) to the MS 2 to prevent a narrow-area ad-hoc communication from being carried out by multiple MSs 2 to which a part of the same narrow-area communication resource (the same time slot number j) has been allocated at the same timing.

Accordingly, as long as a communication is carried out according to a different phase, any collision (interference) of narrow-area ad-hoc communication can be avoided. That is, even when there are multiple MSs 2 that use the resource at the same cycle while each MS 2 changing the cycle of a narrow-area ad-hoc communication according to the traveling speed of the local MS 2, it is possible to avoid collision of narrow-area ad-hoc communications since the initiation timings of the cycle are shifted.

In addition, the BS 1 and the MSs 2 maintain the same phase table (transmission pattern group) 12-2, and a PT-ID that is identification information of a transmission pattern is notified (selection instruction) rather than transmitting the transmission pattern from the BS 1 to the MSs 2. Thus, since it is possible to allocate the transmission pattern, that is, to make the MSs 2 identify (select) transmission pattern, the amount of communications between the BS 1 and the MSs 2 may be minimized, thereby reducing the amount of communications in the entire system. In other words, it is possible to improve the efficiency of resource utilization between the BS 1 and the MSs 2.

Especially, since it is sufficient to carry out allocation of a transmission pattern that the BS 1 only once when an MS 2 enters the communication area 1-2 of the BS 1, the amount of communications between the BS 1 and the MSs 2 may be minimized.

In addition, when there are multiple MSs 2 to which a certain time slot number j are allocated, the BS 1 notifies the MSs 2 that use the time slot of the time slot number j of the TS-ID (TS #j). When the communication cycle for carrying out the narrow-area ad-hoc communication is changed, the BS 1 instructs to initiate a modification control of the transmission timing phase according to the PT-ID that has been allocated. Thus, even if there is an MS 2 that does not change the transmission cycle according to the traveling speed (for example, MS 2 that carries out a narrow-area ad-hoc communication with a shortest transmission cycle as possible considering safety issues), it is possible to force the MS 2 to follow the above-described phase control and thus it is ensured that collision of narrow-area ad-hoc communications is avoided.

Furthermore, the BS 1 instructs termination of a phase control of a communication cycle for carrying out a narrow-area ad-hoc communication when there is only one MS 2 that uses that time slot number j after instructing the initiation of the phase control. Thus, the MS 2 may carry out a narrow-area ad-hoc communication at any timing irrespective of transmission patterns. Accordingly, it is possible to carry out a narrow-area ad-hoc communication with a shortest transmission cycle possible considering safety issues.

(B) Others

Although the above-described embodiment assumes that the BS 1 allocates narrow-area communication resources, narrow-area communication resources may be allocated to each MS 2 in advance, as in the case in which MSs 2 that are located outside the communication area 1-2 of the BS 2 carry out communication with each other. In such a case, it is possible to reduce the occurrence of collisions of narrow-area ad-hoc communications when each MS 2 autonomously (for example, at random, or according to a certain condition) selects a PT-ID in the phase table 23-1, instead of using PT-IDs notified by the BS 1.

In addition, the above described embodiment has been described focusing on the function and operation of the transmission on narrow-area ad-hoc communications (transmission by the MSs 2), a phase control similar to the above-described embodiment may be applied for reception (allocation of reception patterns).

The present invention provides at least one of effects or advantages listed below:

(1) Since each timing for each MS 2 is distributed when each MS 2 changes the timing of inter-MSs communications (resource usage timing) according to its traveling speed, it is possible to avoid collisions of inter-MS communications.

(2) In addition, the efficiency of resource utilization of the inter-MSs communication may be improved.

(3) In addition, since it is sufficient for the BS 1 to allocate the timing patterns only once without receiving reports on traveling speeds from MSs 2, the amount of communications between the BS 1 and the MSs 2 may be minimized, thereby reducing the amount of communications in the entire system.

(4) In other words, it is possible to improve the efficiency of resource utilization between the BS 1 and the MSs 2.

According to the embodiments, efficient usage of a wireless resource employed in a communication between mobile stations can be achieved.

As described in the above in detail, since it is possible to reduce the occurrence of collisions of narrow-area ad-hoc communications (communications between mobile stations), the embodiments are considered quite useful in the technical field of wireless communication, such as the technical field of the ITS.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A wireless base station in a wireless communication system comprising the wireless base station and a plurality of mobile stations, the wireless base station comprising:
    a memory configured to store a plurality of timing patterns for each of the mobile stations, the timing patterns being set such that timings of using a resource are distributed between the different mobile stations and distributed in accordance with traveling speeds of the respective mobile stations, the resource being used for a communication between any of the mobile stations; and
    a controller configured to allocate one of the timing pattern to the mobile stations in order to enable the mobile stations to control a timing of using the resource in accordance with the allocated timing pattern during the communication between the mobile stations.

2. The wireless base station according to claim 1, wherein the timing patterns are patterns having different initiation timings of a usage cycle for a plurality of mobile stations having the same usage cycle of the resource depending on the traveling speed.

3. The wireless base station according to claim 1, wherein the controller allocates the timing pattern by sending a selection instruction of one of the timing patterns to the mobile station having a group of timing patterns that is the same as the timing pattern.

4. A mobile station in a wireless communication system comprising a wireless base station and a plurality of mobile stations, the mobile station comprising:
    a memory configured to store a plurality of timing patterns for each of the mobile stations, the timing patterns being set such that timings of using a resource are distributed between the different mobile stations and distributed in accordance with traveling speeds of the respective mobile stations, the resource being used for a communication between any of the mobile stations;
    a selector configured to select one of the timing patterns in accordance with an instruction from the wireless base station; and
    a controller configured to carry out communication between the other mobile station using the resource identified by the selected timing pattern.

5. The mobile station according to claim 4, wherein the timing patterns are patterns having different initiation timings of a usage cycle for a plurality of mobile stations having the same usage cycle of the resource depending on the traveling speed.

6. A mobile station comprising:
    a memory configured to store a plurality of timing patterns for each of mobile stations including the mobile station, the timing patterns being set such that timings of using a resource are distributed between the different mobile stations and distributed in accordance with traveling speeds of the respective mobile stations, the resource being used for a communication between any of the mobile stations;
    a selector configured to autonomously select one of the timing patterns; and
    a controller configured to carry out communication between the other mobile station using the resource identified by the selected timing pattern.

7. The wireless base station according to claim 1, wherein the timing patterns are set so that frequency of usage of respective transmission timings of the communication between the mobile stations is equalized.

8. The mobile station according to claim 4, wherein the timing patterns are set so that frequency of usage of respective transmission timings of the communication between the other mobile station is equalized.

9. The mobile station according to claim 6, wherein the timing patterns are set so that frequency of usage of respective transmission timings of the communication between the other mobile stations is equalized.

* * * * *